1979 年 11 月 27 日

United States Patent
Molitorisz

[11] 4,175,487
[45] Nov. 27, 1979

[54] BALE FORMING APPARATUS

[76] Inventor: Joseph Molitorisz, 624 81st Ave. NE., Bellevue, Wash. 98004

[21] Appl. No.: 923,829

[22] Filed: Jul. 12, 1978

[51] Int. Cl.² .................................................. B65B 13/20
[52] U.S. Cl. ........................................... 100/8; 100/80
[58] Field of Search ................. 100/76, 80, 81, 8, 40; 19/160, 163; 53/117, 116

[56] References Cited

U.S. PATENT DOCUMENTS

| 751,119 | 2/1964 | Thomas | 100/80 X |
| 928,563 | 7/1909 | Thoens | 100/80 |
| 2,731,782 | 1/1956 | Mason | 100/80 X |

FOREIGN PATENT DOCUMENTS

| 40914 | 4/1909 | Austria | 19/163 |
| 116580 | 2/1930 | Austria | 100/80 |
| 575954 | 4/1958 | Italy | 100/80 |

*Primary Examiner*—Billy J. Wilhite

[57] ABSTRACT

This bale forming apparatus applies continuous feeding and laying of precompressed sheet of fibrous material, such as agricultural crops and industrial products, in a bale forming channel where the body of the bale is built up by the deposition and compression of folded layers of the precompressed material.

The entire bale forming process is accomplished by a simple roller mechanism which requires lower power input than conventional plunger type balers.

This principle is especially suitable to form relatively large size rectangular bales.

2 Claims, 3 Drawing Figures

BALE FORMING APPARATUS

BACKGROUND OF THE INVENTION

1. Field of the Invention

This invention pertains to apparatus for forming rectangular bales of fibrous materials, such as agricultural crops and industrial products, into relatively large size bales, using a continuous process requiring substantially smaller compressive forces than the conventional plunger type balers.

2. Description of Prior Art

The most common type bale forming machines use reciprocating plunger mechanism to press separate layers of loose fibrous materials into relatively small rectangular bales which are tied together by wire or twine. In other widely used machines the layers of loose fibrous material are formed into cylindrical bales by applying a continuous rolling process in a bale forming chamber which is confined by power driven belt systems.

SUMMARY OF THE INVENTION

The principle aim of my invention is to provide an efficient and simple bale forming apparatus with high throughput capacity and low power consumption.

To achieve the desired efficiency and high capacity the entire bale forming process is accomplished in a continuous manner.

To achieve the desired low power consumption and even load distribution, a compressing method is applied which is not characterized by cyclic peak loads followed by substantially idle periods.

The aimed simplicity of the apparatus is achieved through the use of multi-function simple components eliminating the generally necessary complex and interacting sub-systems which need to be fully synchronized for proper operation.

The major unique feature of my invention is the feeder-compactor mechanism which together with its belt system functions as a feeder, receiving the loose bulky fibrous material, precompressing it into a flat continuous sheet and conveying it to the bale forming channel. The oscillating feeder-compactor assembly moves in a plane at the intake port of the bale forming channel between its upper and lower boundaries, covering the entire crossection of the intake port, while continuously receiving and laying the precompressed sheet into folded layers, gradually compressing them into the body of the bale, and forcing the formed bale toward the discharge end of the bale forming channel.

The oscillating motion of the feeder-compactor assembly is achieved by the reversing power drive of the compactor rollers, which are supported by a common frame. The upper feeder-compactor roller is suspended by belts or chains which are fastened to the peripheral surface of the roller, and are allowed to wrap around the roller as it turns under the action of the input drive forcing the assembly to move upward. The other ends of the belts or chains are attached to the upper frame of the bale forming channel. The lower feeder-compactor roller also receives power drive and rotates in a common direction with the upper roller. A plurality of belts or chains is attached to the peripheral surface of the lower roller and to the lower frame of the bale forming channel.

At the uppermost position of the feeder-compactor assembly the belts or chains of the lower roller are extended over the open section of the intake port of the bale forming channel holding the already deposited layers of fibrous material inside the bale forming channel.

The reversal of the rotation of the feeder-compactor rollers causes the wrapping of the belts or chains around the lower roller pulling the feeder-compactor assembly downward. During the downward motion the belts or chains of the upper roller become unwrapped from the roller's body and are extended over the open section of the intake port.

When the desired length of the formed bale is achieved an automatic tying mechanism is activated to tie the bale into a stable unit.

The density of the bales is adjusted by a control mechanism which exerts frictional resistance against the longitudinal motion of the bale in the channel.

DESCRIPTION OF THE PREFERRED EMBODIMENT

Generally stated, this invention may be applied to mobile or stationary apparatus to form fibrous materials, such as agricultural crops and industrial products into compressed bales.

Figure 1:
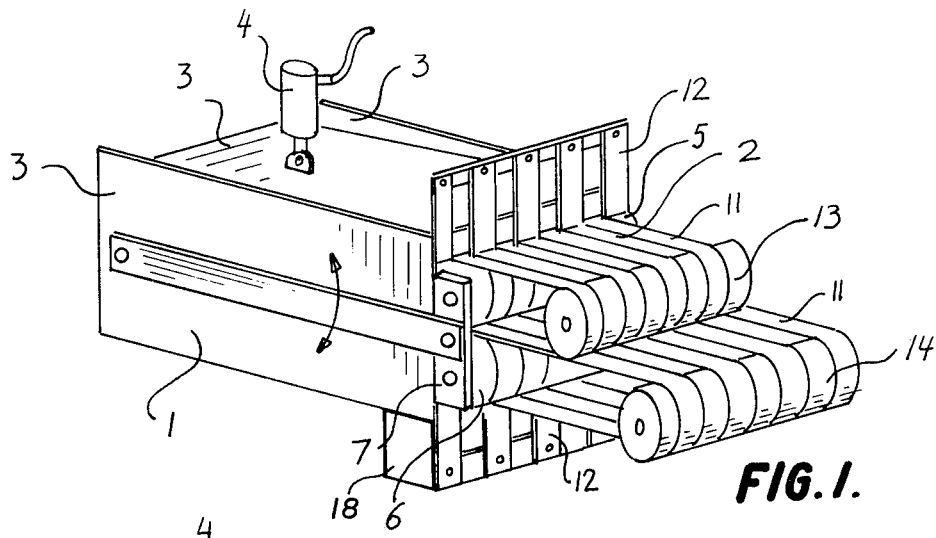
FIG. 1. is an isometric schematic view of the apparatus.
Figure 2:
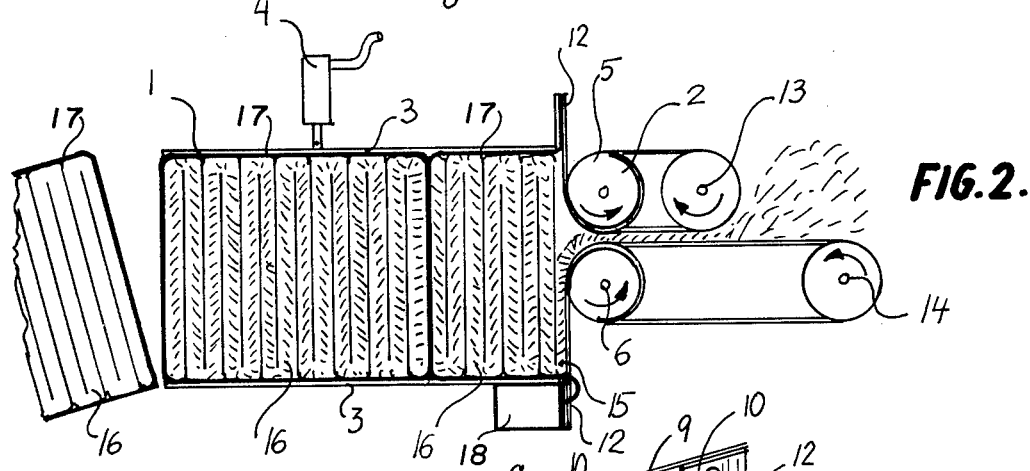
FIG. 2. is a vertical transverse section of the apparatus.
Figure 3:
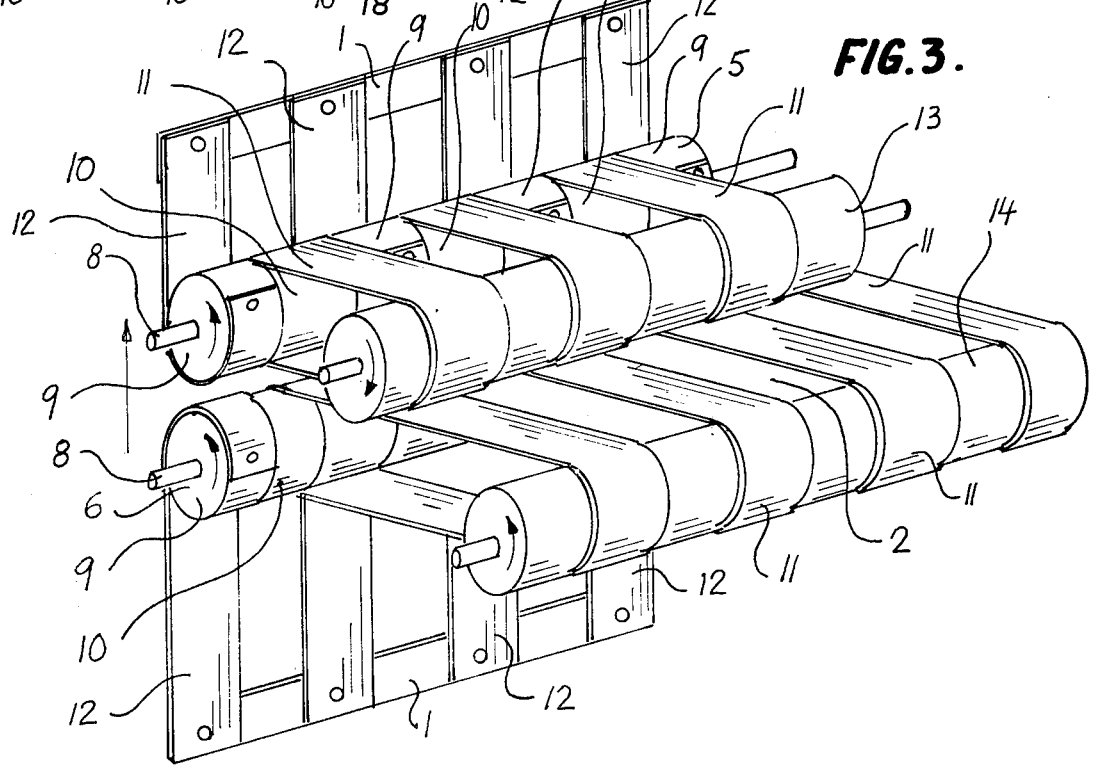
FIG. 3. is an isometric schematic view of the feeder-compactor assembly.

The bale forming mechanism of this invention shown on FIG. 1. comprises the bale forming channel assembly (1), and the feeder-compactor assembly (2). The bale forming channel is confined by four side walls (3) of which two are hinged-supported and pressed against the formed bale by hydraulic cylinders (4) to exert the desired pressure on the bale to develope frictional resistance against the longitudinal movement of the bale in the channel.

At the intake port of the bale forming channel two compactor rollers (5) and (6) are mounted on a common bearing frame (7). The feeder-compactor rollers (5) and (6) are guided in their movement between the upper and lower boundaries of the intake port of the bale forming channel, and are restricted against lateral movement. The length of the feeder-compactor rollers is nearly the same as the lateral width of the intake port of the bale forming channel. Both the upper and lower feeder-compactor rollers receive power drive for simultaneous rotational motion in identical directions.

Each of the feeder-compactor rollers consists of; a common shaft (8) which holds a series of cylindrical compactor disks (9) properly spaced and keyed to the shaft to receive power drive. Between the adjacent compactor disks bearing supported belt pulleys (10) are mounted on the shaft, which receive the belts (11) of the feed mechanism.

Between each of the compactor disks (9) of the upper feeder-compactor roller (5) and the upper frame of the port of the bale forming channel (1) belts or chains (12) are installed which in the upper position of the feeder-compactor assembly (2) are partially wrapped around the compactor disks (9).

Similarly, belts or chains are installed between the compactor disks (9) of the lower feeder-compactor roller and the lower frame of the intake port. When the feeder-compactor assembly (2) is in its upper position these belts or chains are extended over the open section of the intake port holding the layers of the formed bale inside the bale forming channel. When the feeder-compactor assembly is in its lower position the belts or chains of the upper compactor roller cover the open section of the port, while the belts or chains of the lower compactor roller are partially wrapped around the compactor disks (9).

The movement of the feeder-compactor assembly (2) is obtained by the power drive of the feeder-compactor rollers and by the wrapping of the belts or chains around the compactor disks of the upper and lower feeder-compactor rollers.

The endless feed belts or chains (11) which are installed on the pulleys of the upper and lower feeder-compactor rollers and the corresponding power driven feed-rollers (13) and (14), receive and precompress the loose fibrous material, forming it into a continuous flat sheet, and convey this sheet to the bale forming channel. The direction of rotation of the power driven feed-rollers is such that the feed belts positively move the precompressed sheet toward the bale forming channel, regardless of the direction of rotation of the compactor disks of the feeder-compactor rollers.

When the precompressed sheet of the fibrous material reaches the bale forming channel the interaction betwen the feeder-compactor rollers and the uppermost layer of the formed bale causes the laying of the incoming continuous sheet over the uppermost layer of the formed bale. When the feeder-compactor assembly reaches its extreme upper or lower position the direction of rotation of the feeder-compactor rollers is reversed, causing the assembly (2) to start to move in an opposite direction. As this reversing occures the layed sheet becomes folded and a successive layer (15) of the formed bale (16) is deposited. As the result of this repeated reversing of the movement of the feeder-compactor assembly (2) the rapid build-up of the bale is achieved.

The separation and tying of the individual bales is accomplished by an automatic mechanism 18 commonly found in conventional baling machines, which wraps and ties wire or twine 17 around the bale.

The length of the bale forming channel is such that it allowes the continuous forming of the successive bales.

While the preferred forms of the invention have been illustrated, and described, it should be understood that changes may be made without departing from the principles thereof, accordingly the invention is to be limited by a literal interpretation of the claims appended hereto.

I claim:

1. A bale forming apparatus to compress loose fibrous agricultural crops or industrial products into substantially rectangular bales which are being held together by twine, wire or belts, said bale forming apparatus comprising; a longitudinally extending and substantially rectangular bale forming channel assembly, and a feeder-compactor assembly, said bale forming channel assembly having a substantially rectangular intake port, and being confined by longitudinally extending lateral boundaries, at least one of said lateral boundaries being flexibly suspended and inwardly biased by suitable biasing means, said inwardly biased lateral boundaries being in frictional contact with said formed bale exerting frictional resistance against the movement of said formed bale in said bale forming channel, said bale forming apparatus having a suitable mechanism to wrap and tie said wire, twine or belt around said formed bale, said feeder-compactor assembly consisting of; a plurality of feeder-compactor rollers rotatably supported by a common frame and being held substantially parallel relative to each other and at an adjustable distance to confine a transverse intake opening between their adjacent rotational peripheral surfaces, each of said feeder-compactor rollers having a longitudinally extending shaft holding a plurality of substantially cylindrical compactor disks securely fastened to said shaft to receive rotational drive, said compactor disks being separated from each other by substantially cylindrical pulleys, said pulleys being rotatably mounted on said shaft, said feeder-compactor assembly being guided by suitable means to move in a plane at or near to said intake port of said bale forming channel between two of the opposite boundaries of said intake port, said feeder-compactor assembly being suspended by a plurality of belts, chains or ropes being securely attached to said compactor disks of said feeder-compactor rollers, allowing said belts, chains or ropes to wrap around said compactor disks when said feeder-compactor rollers receive rotational power drive, the opposite ends of said belts chains or ropes being securely attached to suitable structural components of said bale forming channel, said belts, chains or ropes being extended between said feeder-compactor rollers and said suitable structural components of said bale forming channel in such way that those chains, belts or ropes being securely attached to the compactor disks of said upper feeder-compactor roller are also being securely attached to said suitable structural component at or near the upper boundaries of said bale forming channel, said chains, belts or ropes being securely attached to said compactor disks of said lower feeder-compactor roller are also being securely attached to said suitable structural component at or near said lower boundaries of said bale forming channel, said belts, chains or ropes being used to suspend said feeder-compactor assembly and to partially cover said intake port of said bale forming channel, holding the deposited layers of the bale being formed in said bale forming channel, said feeder-compactor rollers receiving external power drive to cause simultaneous rotational motion for each of said feeder-compactor rollers, said simultaneous rotational motion being in identical direction at a substantially identical peripheral speed of said feeder-compactor rollers, said simultaneous rotational motion of said feeder-compactor rollers being reversed at suitably selected intervals causing the wrapping of said chains, belts or ropes around said compactor disks inducing the movement of said feeder-compactor assembly in said plane between or beyond said upper and lower boundaries of said intake port of said bale forming channel, said rotatably mounted pulleys of said feeder-compactor rollers being connected to suitably positioned feeder-rollers by a plurality of endless chains, belts or ropes, said feeder-rollers being journally mounted in a suitable frame and receiving power drive to cause their rotation in such a way that the interaction between said plurality of said endless chains, belts or ropes connecting said feeder-compactor rollers and said corresponding feeder-rollers compress the loose fibrous material into a sheet like configuration and convey said sheet of compressed material to said intake port of said bale forming channel regardless of the direction of rotation of said feeder-compactor rollers, said feeder-compactor rollers receiving and laying said compressed sheet of fibrous material in a plane which is confined by the lateral boundaries of said intake port of said bale forming channel, said laying of the compressed sheet of fibrous material being accomplished in a continuous process by reversing the direction of the movement of said feeder-compactor assembly in said plane at or near said intake port of said bale forming channel at properly selected positions relative to said upper and lower boundaries of said intake port of said bale forming channel, said reversal of the direction of motion of said feeder-compactor assembly in said plane at or near said intake port of said bale forming channel causing the reversal of the laying of said compressed fibrous sheet, folding said sheet at or near to said upper and lower boundaries of said intake port of said bale forming channel resulting in the building up the body of said formed bale by depositing and compressing the subsequently folded layers in said bale forming channel, said feeder-compactor rollers exerting compressive forces on said formed bale composed of a plurality of layers of folded compressed sheets of said fibrous material causing the compaction and sliding movement of said formed bale in said bale forming channel, said formed bale having reached its desired length being tied together by a suitable tying mechanism with twine, wire or belt, said formed and tied bale being forced out from said bale forming channel at its discharge end by the subsequently formed bales, said individual bales being separated by said tying means.

2. A bale forming apparatus of claim 1, having said feeder-compactor assembly mounted substantially stationary relative to said bale forming channel assembly, and having said bale forming channel assembly power driven and guided by suitable means to move in a plane at or near to said feeder-compactor rollers of said feeder-compactor assembly in a direction substantially perpendicular to the longitudinal axes of said feeder-compactor rollers, and having the direction of motion of said bale forming channel assembly reversed at proper intervalls to have the precompressed sheet of said fibrous material deposited, folded and compressed into the body of said formed bale in said bale forming channel.

* * * * *